United States Patent [19]

Rabe

[11] Patent Number: 5,238,616
[45] Date of Patent: Aug. 24, 1993

[54] METHOD FOR PROTECTING RENOVATING AND RESTORING STONE, STRUCTURES, MONUMENTS AND THE LIKE

[76] Inventor: Jürgen W. Rabe, Bessenbacher Weg 70, D-8750 Aschaffenburg, Fed. Rep. of Germany

[21] Appl. No.: 466,512

[22] Filed: Jan. 17, 1990

Related U.S. Application Data

[63] Continuation of Ser. No. 178,491, Apr. 7, 1988, abandoned.

[30] Foreign Application Priority Data

Apr. 16, 1987 [DE] Fed. Rep. of Germany ....... 3712967

[51] Int. Cl.$^5$ ............................................. B32B 35/00
[52] U.S. Cl. ....................... 264/36; 264/133; 427/140; 427/230; 427/245
[58] Field of Search ............... 264/36, 82, 259, 133; 427/245, 140, 230, 236

[56] References Cited

U.S. PATENT DOCUMENTS

| | | | |
|---|---|---|---|
| 3,264,134 | 8/1966 | Vill et al. | 427/245 |
| 3,360,394 | 12/1967 | Griffin et al. | 427/245 |
| 3,743,626 | 7/1973 | Emmons | 528/73 |
| 3,971,764 | 7/1976 | Schurmann et al. | 428/425 |
| 4,240,995 | 12/1980 | Milne | 264/36 |
| 4,270,331 | 6/1981 | Lang et al. | 52/744 |
| 4,305,977 | 12/1981 | Kubitza et al. | 427/245 |
| 4,381,388 | 4/1983 | Naples | 528/59 |
| 4,454,252 | 6/1984 | Meyer | 521/110 |
| 4,475,847 | 10/1984 | Cornely et al. | 521/174 |
| 4,661,532 | 4/1987 | Morin | 521/167 |

FOREIGN PATENT DOCUMENTS

| | | | |
|---|---|---|---|
| 48-041265 | 12/1973 | Japan | 427/245 |
| 8601020 | 11/1987 | Netherlands | 427/245 |

*Primary Examiner*—Allan R. Kuhns
*Attorney, Agent, or Firm*—John F. A. Earley; John F. A. Earley, III

[57] ABSTRACT

A method of protecting, renovating, or restoring a stone structure comprises treating the stone structure with a solution that includes an aliphatic isocyanate and one or more organic solvents inert to the aliphatic isocyanate, the aliphatic isocyanate being cured by exposure to moisture.

8 Claims, No Drawings

METHOD FOR PROTECTING RENOVATING AND RESTORING STONE, STRUCTURES, MONUMENTS AND THE LIKE

This is a continuation of application Ser. No. 178,491, filed Apr. 7, 1988 now abandoned.

BACKGROUND OF THE INVENTION

Stone structures, monuments and the like, hereinafter designated for the sake of simplicity as structures, are subjected in the course of years to a constant exposure to the atmosphere. The surface of the structures is constantly exposed to the harmful substances contained in the atmosphere, such as carbon dioxide, carbon monoxide, sulfur dioxide, nitrogen oxides etc., along with the moisture deposited by rain and fog. Dirt is deposited in the pores and together with metabolic products produced by the microorganisms, and the stone texture of the structure is destroyed, thus bringing about a more or less rapid erosion of the stone material used in the structure.

In the course of the years, this results in a continuously progressing destruction of the structure.

In the case of historical structures, monuments and the like, in particular, this continuous process of destruction proves to be extremely unpleasant because irreplaceable assets are always lost as a result.

Great efforts have already been made to stop this process of destruction and, in addition, to renovate the damage which has already occurred.

For this purpose, stone materials are treated with solutions of silicic-acid ester. A part of its natural binder is therefore returned to the stone.

This known silicic-acid ester method is, however, applicable to lime-bound materials only to a limited extent.

In addition, a further disadvantage can be seen in the fact that the pores present in the stone material are largely sealed so that the natural breathing of the stone material is impaired by the treatment.

SUMMARY OF THE INVENTION

Starting from this known prior art, it is therefore the object of the present invention to provide a new method for protecting, renovating and restoring stone structures, monuments and the like which can be applied to all stone materials and which retains, in particular, the capillary texture present in the stone material.

This object is achieved according to the invention with a method of the type defined above, wherein the structure is treated with a solution which consists of an aliphatic isocyanate and one or more organic solvents inert thereto, and then the isocyanate is cured by exposure to moisture.

DESCRIPTION OF THE PREFERRED EMBODIMENTS

The isocyanate used in the method according to the invention is preferably a polyisocyanate prepolymer which is commercially obtainable, for example, under the designation Desmodur E. Such a polyisocyanate prepolymer has reactive isocyanate groups which are able to react with the moisture of the air and form polymers in doing so.

The content of reactive NCO groups is preferably approx. 8.5% and the equivalent weight is preferably in the range of 500.

It may be noted, however, that other polyisocyanate prepolymers, which polymerize and consequently cure after introduction into the texture of the stone, may also be used in the method according to the invention.

The solvents used in the method according to the invention should be solvents which are inert in relation to the polyisocyanate prepolymer.

Accordingly, a multiplicity of solvents is available.

The preferred solvents are chosen in accordance with aspects such as low toxicity, inexpensiveness, good solution properties, good wetting of the stone material etc.

Preferred solvents are xylene, methyl isobutyl ketone, solvent naphtha, toluene, ethyl acetate, isobutyl acetate, acetone and methoxypropyl acetate.

Solvent combinations can, of course, also be used for the treatment with the aliphatic isocyanate.

Preferred solvent mixtures are the following examples:

1) 30 parts by weight of xylene, 100 parts by weight of methyl isobutyl ketone;

2) 250 parts by weight of isobutyl acetate, 180 parts by weight of xylene, 350 parts by weight of solvent naphtha;

3) 250 parts by weight of methyl isobutyl ketone, 180 parts by weight of xylene, 350 parts by weight of solvent naphtha;

4) 30 parts by weight of xylene, 80 parts by weight of acetone, 80 parts by weight of isobutyl acetate;

5) 100 parts by weight of ethyl acetate, 70 parts by weight of toluene, 30 parts by weight of acetone;

6) 100 parts by weight of toluene, 30 parts by weight of acetone, 30 parts by weight of methoxypropyl acetate.

The method according to the invention for treating structures can be subdivided into those methods which are used exclusively for protecting as yet undamaged structures, furthermore into those for the renovation of already damaged structures and finally into methods for restoring heavily damaged structures.

According to this classification, the method according to the invention comprises, on the one hand, the so-called hydrophobizing of the structure in which hydrophobizing is carried out superficially by applying a solution of 1 to 10 parts by weight of the aliphatic isocyanate and 99 to 90 parts by weight of the solvent inert thereto or the solvent combination inert thereto.

As a result of this measure of the method, the isocyanate solution penetrates a few mm into the stone material. The solvent evaporates and the isocyanate reacts with the moisture to form a polymer film which coats the surface of the stone and the entire capillary system, and specifically, the capillary walls to the depth specified above, with a polymer film.

The capillaries themselves, however, remain open and, consequently, the vapor diffusion capability of the stone material remains intact to the greatest possible extent.

In this manner, a hydrophobizing of the surface is achieved which has the effect that the stone becomes water-repellent. The rain and the dirt applied with it therefore trickle off the stone and the dirt is no longer deposited on the stone. Consequently, there is no longer any habitat for the microorganisms which, as a consequence of their metabolic products, cause an initial incipient solution of the stone texture and as a result, provide the condition for the penetration of further moisture and further dirt and for exposure to the harmful substances contained in the atmosphere.

The concentration of the isocyanate in the solvent necessary for the hydrophobizing depends on the size of the capillary system of the stone material. A quite coarse structure of the stone requires a substantially higher proportion of isocyanate in the solution than a fine capillary structure.

The concentration of the solution is therefore expediently determined on the basis of empirical tests.

For the renovation of structures which are already damaged, according to the method according to the invention, a solution of 3 to 15% by weight of aliphatic isocyanate and 97 to 85% by weight of the solvent inert thereto or the solvent mixtures inert thereto are applied.

This solution penetrates into the pores, coats the capillary walls with a polymer film and thus consolidates the already damaged stone texture. The capillaries themselves, however, remain intact and continue to be available for the vapor diffusion of the stone.

In the method according to the invention, no closed surface layer is produced and no direct chemical reaction takes place with the stone material itself. No crust is formed.

The consolidation by the method according to the invention takes place, on the contrary, only as a result of the penetration into the capillary spaces and the lining of the walls of the capillaries with the polymer film, which has the result that the nature of the stone is completely irrelevant for the method according to the invention and, accordingly, also in contrast to the known silicic acid ester method, does not present any limitation for the method according to the invention.

The restoration of heavily damaged structures is carried out by the method according to the invention by applying a moldable compound from a solution of 3 to 70% by weight of aliphatic isocyanate in 97 to 30% by weight of solvent inert thereto or of solvent mixture inert thereto and mineral constituents. A preferred concentration range is 8 to 30% by weight of isocyanate and 92 to 70% by weight of solvent mixture.

In the case of a moldable stone replacement compound applied in such a manner, the solvent evaporates and the isocyanate left behind cures under the influence of moisture and the cured compound thus replaces the stone substance already lost, suitable choice of the mineral constituents used in the moldable compound expediently ensuring that the stone parts replaced in this manner have the same appearance as the remaining stone.

Process techniques usual per se can be applied for the application of the solutions in the method according to the invention. For hydrophobizing, a spraying on, brushing on or flooding may expediently be used. At the same time, for the renovation of already damaged structures, an impregnation in the solution, or if this is not possible because of the size of the structure, a multiple brushing on or spraying on or application by means of a flowing film (flooding) is suitable.

The invention is explained in more detail on the basis of the examples below and at the same time the stone samples obtained, treated with the method according to the invention, are tested in comparison with untreated stone samples for their properties and the results are compared.

EXAMPLE 1

Mechanical rupture tests

For the rupture tests, prisms measuring $4 \times 4 \times 16$ cm were cut from Soskut soft lime quarrystone. The test specimens were saturated by absorption from a solvent layer as a consequence of capillary activity and tested after the treatment in a comparison with the untreated specimens. In this process, the following results were obtained:

| Soskut quarrystone test | | | | | | |
|---|---|---|---|---|---|---|
| Treatment with the polyisocyanate prepolymer solution in a mixture of 50% by weight of xylene and 50% by weight of methyl isobutyl ketone | | | | | | |
| Untreated test specimen | | Concentration of the solution in % by weight | | | Increase in % | |
| $\delta$ | $\partial$ | | $\delta$ | $\partial$ | $\delta$ | $\partial$ |
| 8.1 | 32.5 | 10 | 30.2 | 47.6 | 273 | 46 |
| Chipped stone from the surface Layer of the Soskut quarry | | | | | | |
| Treatment with the polyisocyanate prepolymer solution | | | | | | |
| Untreated test specimen | | Concentration of the solution in % by weight | | | Increase in % | |
| $\delta$ | $\partial$ | | $\delta$ | $\partial$ | $\delta$ | $\partial$ |
| 8.0 | 30 | 10 | 32 | 48 | 300 | 60 |

$\delta$ = tensile strength in bending N/mm$^2$
$\partial$ = compression strength N/mm2

EXAMPLE 2

Böhm wear-resistance test of weathered Soskut soft lime quarrystone

The surface of quarrystone blanks was impregnated with a 12% polyisocyanate prepolymer solution in a mixture of 50% by weight of xylene and 50% by weight of methyl isobutyl ketone, the solution being drawn into the stone under the influence of capillary activity.

The stone specimen treated in this manner was subjected to the Böhm wear-resistance test along with an untreated stone specimen. In this process, the following results were obtained:

| | Before the wear test | | After the wear test | | Difference | | |
|---|---|---|---|---|---|---|---|
| | Mass g | Thickness mm | Mass g | Thickness mm | Mass g | Thickness mm | Increase % |
| Untreated | 382.7 | 41.3 | 285.8 | 31.2 | 96.9 | 10.1 | 35% |
| Treated | 332.4 | 40.6 | 275.8 | 34.0 | 56.6 | 6.6 | |

EXAMPLE 3

Vapor diffusion test of Soskut soft lime quarrystone

The tests were determined on the basis of the binding to $CaCl_2$ of quantities of moisture which were absorbed from the air and which had diffused through disk-shaped test specimens having a diameter of 7 cm. The concentration of the polyisocyanate prepolymer solutions used for treating the specimens in a mixture of 50% by weight of xylene and 50% by weight of methyl isobutyl ketone was by weight. The quarrystone disk had absorbed the solution as a consequence of the capillary activity.

The following results were obtained:

| | Parameter | | Increase in weight of the quantity of $CaCl_2$ g | Decrease in the vapor diffusion in % |
|---|---|---|---|---|
| | Test time h | Thickness cm | | |
| Untreated | 984 | 2.20 | 19.5 | |
| Treated | 984 | 2.23 | 15.9 | 18.5 |

EXAMPLE 4

Frost resistance test

Prisms measuring 4×4×16 cm were manufactured from the Soskut soft lime quarrystone and similar test specimens were produced to test the stone substitute material.

The polyisocyanate prepolymer solution in a mixture of 50% by weight of xylene and 50% by weight of methyl isobutyl ketone used for the treatment was a 12% by weight solution which the test specimen absorbed from a solution as a result of the capillary activity.

Test method

The number of cycles between freezing to −20° C. and breakdown in water at +20° C. was tested. The number of cycles which the specimen passed through without damage was compared.

The increase in frost resistance of the Soskut soft limestone as a consequence of treatment with the solution according to the invention was 60%.

EXAMPLE 5

Water absorption test

In each case 5 pieces of the Ihrl sandstone and of the Udelfang sandstone cut to the same size were subjected to storage in water in the untreated state and after impregnation with the 6% by weight polyisocyanate prepolymer solution according to the invention in a mixture of 50% by weight xylene and 50% by weight methyl isobutyl ketone.

The results are listed below:

| | Ihrl sandstone (untreated) | | | | | | | |
|---|---|---|---|---|---|---|---|---|
| Specimen No. | Weight, g Days of storage in water | | | | After drying | Dimensions, mm | | |
| | 5 | 6 | 7 | 8 | | Length | Width | Height |
| 1 | 314.33 | 314.40 | 314.54 | 314.54 | 294.10 | 52 | 52 | 52 |
| 2 | 312.63 | 312.73 | 312.82 | 312.82 | 292.05 | 52 | 52 | 51 |
| 3 | 310.98 | 311.09 | 311.22 | 311.22 | 290.73 | 51 | 51 | 52 |
| 4 | 310.17 | 310.33 | 310.39 | 310.39 | 289.51 | 51 | 51 | 52 |
| 5 | 309.47 | 309.66 | 309.78 | 309.78 | 289.58 | 51 | 51 | 52 |

| Specimen No. | Weight, g | | Water absorption $W_a$ | Weight per unit volume $kg/dm^3$ | Water absorption | |
|---|---|---|---|---|---|---|
| | Dry | Saturated with water | | | % by mass | % by volume |
| 1 | 294.10 | 314.54 | 20.44 | 2.09 | 6.95 | 14.54 |
| 2 | 292.05 | 312.82 | 20.77 | 2.12 | 7.11 | 15.06 |
| 3 | 290.73 | 311.22 | 20.49 | 2.15 | 7.05 | 15.15 |
| 4 | 289.51 | 310.39 | 20.88 | 2.14 | 7.21 | 15.44 |
| 5 | 289.58 | 309.78 | 20.20 | 2.14 | 6.98 | 14.94 |
| | | | | Average: | 7.06 | 15.02 |

| | Ihrl sandstone (impregnated with the solution according to the invention) | | | | | | | |
|---|---|---|---|---|---|---|---|---|
| Specimen No. | Weight, g Days of storage in water | | | | After drying | Dimensions, mm | | |
| | 5 | 6 | 7 | 8 | | Length | Width | Height |
| 1a | 297.49 | 297.67 | 297.86 | 297.86 | 292.88 | 52 | 51 | 51 |
| 2a | 297.65 | 297.84 | 298.02 | 298.02 | 292.93 | 52 | 51 | 51 |
| 3a | 297.04 | 297.18 | 297.31 | 297.31 | 292.72 | 52 | 51 | 50 |
| 4a | 293.58 | 293.70 | 293.84 | 293.85 | 289.40 | 52 | 51 | 50 |
| 5a | 292.39 | 292.54 | 292.66 | 292.66 | 288.14 | 52 | 51 | 50 |

| Specimen No. | Weight, g | | Water absorption $W_a$ | Weight per unit volume $kg/dm^3$ | Water absorption | |
|---|---|---|---|---|---|---|
| | Dry | Saturated with water | | | % by mass | % by volume |
| 1a | 292.88 | 297.86 | 4.98 | 2.17 | 1.70 | 3.68 |
| 2a | 292.93 | 298.02 | 5.09 | 2.17 | 1.74 | 3.76 |
| 3a | 292.72 | 297.31 | 4.59 | 2.16 | 1.57 | 3.39 |
| 4a | 289.46 | 293.85 | 4.45 | 2.18 | 1.54 | 3.36 |
| 5a | 288.14 | 292.66 | 4.52 | 2.17 | 1.57 | 3.41 |
| | | | | Average: | 1.62 | 3.52 |

| | Udelfang sandstone (untreated) | | | | | | | |
|---|---|---|---|---|---|---|---|---|
| Specimen No. | Weight, g Days of storage in water | | | | After drying | Dimensions, mm | | |
| | 5 | 6 | 7 | 8 | | Length | Width | Height |
| 1 | 277.61 | 277.90 | 278.07 | 278.07 | 256.11 | 51 | 51 | 50 |
| 2 | 277.37 | 277.60 | 277.77 | 277.77 | 256.47 | 51 | 51 | 50 |
| 3 | 281.17 | 281.41 | 281.66 | 281.66 | 261.53 | 51 | 51 | 50 |
| 4 | 274.53 | 274.85 | 275.05 | 275.05 | 251.95 | 51 | 51 | 50 |

-continued

| | | | | | | | | |
|---|---|---|---|---|---|---|---|---|
| 5 | 269.33 | 269.61 | 269.81 | 269.81 | 245.43 | 51 | 51 | 50 |

| | Weight, g | | | | Water absorption | |
|---|---|---|---|---|---|---|
| Specimen No. | Dry | Saturated with water | Water absorption $W_a$ | Weight per unit volume kg/dm$^3$ | % by mass | % by volume |
| 1 | 256.11 | 278.07 | 21.96 | 1.97 | 8.57 | 16.87 |
| 2 | 256.47 | 277.77 | 21.30 | 1.97 | 8.31 | 16.38 |
| 3 | 261.53 | 281.66 | 20.13 | 2.01 | 7.70 | 15.48 |
| 4 | 251.95 | 275.05 | 23.10 | 1.94 | 9.17 | 17.76 |
| 5 | 245.43 | 269.81 | 24.38 | 1.89 | 9.93 | 18.75 |
| | | | | Average: | 8.74 | 17.05 |

Udelfang sandstone (impregnated with the solution according to the invention)

| Specimen No. | Weight, g Days of storage in water | | | | After drying | Dimensions, mm | | |
|---|---|---|---|---|---|---|---|---|
| | 5 | 6 | 7 | 8 | | Length | Width | Height |
| 1a | 270.09 | 270.49 | 270.85 | 271.10 | 267.12 | 50 | 50 | 51 |
| 2a | 248.19 | 248.95 | 249.61 | 250.47 | 243.10 | 50 | 50 | 51 |
| 3a | 251.81 | 252.38 | 252.80 | 253.20 | 248.26 | 50 | 50 | 51 |
| 4a | 250.56 | 250.92 | 251.14 | 251.50 | 247.89 | 50 | 50 | 51 |
| 5a | 250.01 | 250.80 | 251.38 | 252.08 | 245.25 | 50 | 50 | 51 |

| | Weight, g | | | | Water absorption | |
|---|---|---|---|---|---|---|
| Specimen No. | Dry | Saturated with water | Water absorption $W_a$ | Weight per unit volume kg/dm$^3$ | % by mass | % by volume |
| 1a | 267.12 | 271.10 | 3.98 | 2.10 | 1.49 | 3.12 |
| 2a | 243.10 | 250.47 | 7.37 | 1.91 | 3.03 | 5.78 |
| 3a | 248.26 | 253.20 | 4.94 | 1.95 | 1.99 | 3.87 |
| 4a | 247.89 | 251.50 | 3.61 | 1.94 | 1.46 | 2.83 |
| 5a | 245.25 | 252.00 | 6.75 | 1.92 | 2.75 | 5.29 |
| | | | | Average: | 2.14 | 4.18 |

EXAMPLE 6

Modified Quervain crystallization test

The same Udelfang sandstone test specimens were used as in Example 5 (5 pieces untreated and 5 pieces treated with the solution according to the invention as in Example 5). The specimens were subjected to the Quervain crystallization test using 10% sodium sulfate solution.

After 10 cycles sand formation was observed in the untreated test specimens, while, in the case of the treated test specimens, there was still no change even after 20 cycles.

I claim:

1. A method of treating a stone structure having an outer surface and capillaries extending to the outer surface with a solution consisting essentially of 1–10% by weight of a polyisocyanate prepolymer and at least one vaporizable organic solvent inert to said polyisocyanate prepolymer which has reactive isocyanate groups capable of reacting with moisture to form polymers, said reactive isocyanate groups in said solution remaining unreacted until contacted with moisture, which comprises the steps of applying the solution to the outer surface of the stone structure, penetrating pores of the capillaries of the stone structure with the solution, contacting the walls of the capillaries with the solution, evaporating the solvent, permitting the applied solution to react with moisture, forming a hydrophobic polymeric film on the walls of the capillaries and on the outer surface of the stone structure as moisture reacts with the applied solution, keeping the pores open by coating the walls of the capillaries with the polymeric film rather than blocking the capillaries with the polymeric film, and permitting vapor diffusion into the stone via the film coated open capillaries of the stone structure.

2. Method according to claim 1 wherein said polyisocyanate prepolymer is an aliphatic isocyanate.

3. Method according to claim 1 wherein said polyisocyanate prepolymer contains approximately 8.5% by weight of reactive NCO groups.

4. Method according to claim 1 wherein said solvent is selected from the group consisting of xylene, methyl isobutyl ketone, solvent naphtha, toluene, ethyl acetate, isobutyl acetate, acetone and methoxypropyl acetate.

5. A method of treating a stone structure having an outer surface and capillaries extending to the outer surface with a solution consisting essentially of 3–15% by weight of a polyisocyanate prepolymer in at least one vaporizable organic solvent inert to said polyisocyanate prepolymer which has reactive isocyanate groups capable of reacting with moisture to form polymers, said reactive isocyanate groups in said solution remaining unreacted until contacted with moisture, which comprises the steps of applying the solution to the outer surface of the stone structure, penetrating pores of the capillaries of the stone structure with the solution, contacting the walls of the capillaries with the solution, evaporating the solvent, permitting the applied solution to react with moisture, forming a hydrophobic polymeric film on the walls of the capillaries and on the outer surface of the stone structure as moisture reacts with the applied solution, keeping the pores open by coating the walls of the capillaries with the polymeric film rather than blocking the capillaries with the polymeric film, and permitting vapor diffusion into the stone via the film coated open capillaries of the stone structure.

6. Method according to claim 5 wherein said polyisocyanate prepolymer is an aliphatic isocyanate.

7. Method according to claim 5 wherein said polyisocyanate prepolymer contains approximately 8.5% by weight of reactive NCO groups.

8. Method according to claim 5 wherein said solvent is selected from the group consisting of xylene, methyl isobutyl ketone, solvent naphtha, toluene, ethyl acetate, isobutyl acetate, acetone and methoxypropyl acetate.

* * * * *